Patented Jan. 21, 1941

2,229,199

UNITED STATES PATENT OFFICE 2,229,199

CATALYST AND PROCESS FOR ITS PRODUCTION

Alexis Voorhies, Jr., Baton Rouge, La., assignor to Standard Oil Development Company No Drawing. Application December 17, 1935, Serial No. 54,853

9 Claims. (Cl. 252—212)

This invention relates to an improved process for preparing catalysts for reactions conducted at high temperatures of the order of 900° F. and upwards, and more particularly to an improved method for preparing strong catalysts by forming tablets, pills, or other lumps by compressing a powder containing active catalytic elements such as difficulty reducible oxides. It is a special object of this invention to provide a process for making strong catalysts in pill form containing nickel and a difficulty reducible oxide for use in the production of hydrogen by the reaction between steam and a hydrocarbon.

Hydrogen is prepared by passing a hydrocarbon vapor (preferably a normally gaseous hydrocarbon) and steam or carbon dioxide over a catalyst containing nickel, or other suitable metal, at a high temperature. It has been suggested to use oxides of metals which are not reducible by hydrogen at the reaction temperature as a diluent and support for the catalytic metal. Alumina, silica, chromic oxide and magnesia are examples of suitable oxides, but any oxide which is not reduced by hydrogen at temperatures of about 2000 to 3000° F. and which is solid at 2000° F., is suitable for this purpose.

The production of hydrogen from hydrocarbons and steam involves high temperatures and gas rates which cause a rapid reduction of many catalysts to powder, or dust, and render them unsuitable. It is accordingly desirable to use very rugged catalysts in this process, but at the same time the catalysts must also show a high degree of activity.

One method for preparing strong catalysts is by grinding into a powder a mixture of the catalyst components, and then compressing this powder into lumps or tablets. These tablets are further strengthened by the addition of small amounts of inorganic compounds which react with the metal oxides to form metal compounds which have a fusion temperature above the maximum temperature at which the catalyst is exposed in use, say above 2000 to 3000° F. Such inorganic compounds are preferably weakly acidic, when the difficultly reducible oxide is basic, and have a melting point below about 1000 to 1500° F., in order to permit intimate mixing and rapid reaction with the metal oxides of the catalyst composition. Examples of such inorganic compounds which may be used are of the class of acids, oxides and salts of fluorine, silicon, tin, germanium, bismuth, aluminum, lead, boron, tungsten, and the like, such as sodium fluoride, silica, sodium silicate, alumina, boric acid and tungstic acid.

When the metal oxide associated with the nickel is alumina, chromium oxide or some other acidic oxide, the substance added to impart strength is preferably a basic oxide such as magnesia or some other alkaline earth oxide. Such compounds are added in small amounts of usually about ½ to 2 to 10%, though these limits may be exceeded. Strength is imparted to the catalyst by these additions only when the catalyst mixture is heated up during its preparation to a temperature sufficiently high to cause a reaction to occur between the difficultly reducible oxide and the added substance, usually at a temperature not less than 1700° F.

The catalyst preferably contains a larger amount of the metal oxide than of nickel or other active catalytic metal. For example, the catalyst may consist of 50% or more of magnesia and the remainder of a catalytic metal such as nickel. Catalysts containing about 75% magnesia and 25% of nickel are preferred.

It has already been proposed to facilitate the formation of pilled catalysts by including in their composition a lubricant, and to strengthen the pills by heating the resulting mixture to a high temperature, upwards of 1600° F. The lubricants hitherto proposed are in general organic compounds of the oxygenated type or the hydrocarbon type. When these substances are heated to the temperature required for strengthening the catalyst they have a tendency to decompose with the evolution of gas. In small pills this decomposition of the lubricant is not particularly troublesome. In larger pills, however, for example those having a diameter of at least 20 mms., the decomposition of the lubricant in the interior of the pills, before the burning off of the lubricant has progressed to the interior of the pills, causes the evolved gases to set up an internal pressure which in some instances is sufficiently great to cause the pills to crumble. Of course, when the pills remain intact throughout the heating step with the lubricants formerly employed they have greater strength than when heated in the absence of the lubricant. The loss through crumbling, however, has been found to be quite considerable.

It has now been found that graphite is a highly efficacious lubricant for the formation of pilled catalysts. Due to the fact that graphite does not decompose at elevated temperatures, the heating of large pills can be conducted without the setting up of internal pressure in the pills. Consequently, crumbling of the catalyst is entirely eliminated. Moreover, by the employment of graphite as a lubricant, the pilling operation proceeds more smoothly and without any sticking of the pills in the pilling machine. In addition it has been found that pilled catalysts of all sizes are stronger when prepared with graphite as a lubricant than when prepared with the lubricants previously proposed.

The following examples are presented to indicate suitable specific embodiments of the present invention, and are not to be considered as limiting this invention in any way:

Example 1

1455 parts by weight of nickel nitrate hexahydrate were dissolved in 500 parts of water. 750 parts of magnesium oxide were then slowly added to the solution with stirring and the resulting paste was dried and heated at about 850–900° F. to convert the nitrates to oxides and to drive off the oxides of nitrogen. The heated powder was passed through a 10 mesh screen and was then formed into a dense mass by compression, using pressures of the order of 10,000 pounds per square inch in a tablet machine. The tablets were in the form of right cylinders, 3/16 inch in diameter and 3/16 inch in height. The tablets first formed were crushed to about 10 mesh and then again formed into tablets, thereby removing occluded air and improving their strength. The second tablets were then heated in air to a temperature of 1900° F. for 24 hours. After use in the methane-steam reaction, these tablets showed a resistance to crushing of 800–1200 lbs./sq. in.

Example 2

Two catalysts of the same composition of nickel and magnesia were prepared in the manner described in Example 1. In the first, before pilling, 2% of boric acid was incorporated and the catalytic pills were heated for 22 hours at 1800° F. The pills so prepared, after being used in the methane-steam reaction, showed a resistance to crushing of 3090 lbs./sq. in. During the pilling operation many of the pills crumbled and frequent interruption of the pilling operation was caused by sticking of the pills in the pilling machine.

In the second batch of catalyst 2% of boric acid and 1% of graphite were added prior to the pilling operation. The pilling operation proceeded without any interruption due to sticking and no crumbling of the pills occurred. This catalyst was heated in pill form for 22 hours at 1800° F. After being used in the methane-steam reaction, under the same conditions and for the same period as in the previous examples, these pills showed a resistance to crushing of 3300 lbs./sq. in.

When the pills of this last batch were heated at 2000° F. for 32 hours, they showed, after the same period of use in the methane-steam reaction, a resistance to crushing of 4200 lbs./sq. in.

Example 3

A catalyst mixture composed of 4% of chromium oxide, by weight, and 96%, by weight, of alumina obtained by saturating alumina with the required amount of a solution of chromium nitrate and roasting at about 350° F. is mixed with 1% of graphite and 2% of boric acid and compressed into pills. The pills, when heated for 20 hours at 1500° F. turned white and had a strength, under compression, of 103 lbs./sq. in. The same pills, when heated for 20 hours at 1800° F. turned pink and had a strength of 1800 lbs./sq. in. This catalyst exhibits satisfactory activity in the dehydrogenation of hydrocarbons at a temperature of about 1000° F.

Example 4

A catalyst mixture composed of 1 molecular weight of chromium oxide and 150 grams of magnesia has added to it 1% of graphite and 2% of boric acid and is pilled. The pills, upon being heated for 20 hours at 1500° F. show a resistance to pressure of 1375 lbs./sq. in. When heated for 20 hours at 1700° F. the pills show a resistance to pressure of 2670 lbs./sq. in. When heated at 2000° F. for 20 hours the pills show a resistance to pressure of 5400 lbs./sq. in. When the content of magnesia in the catalyst is doubled and the pills are heated at 1700° F. for 20 hours the resistance to pressure is 3130 lbs./sq. in. This catalyst is also suitable for use in the dehydrogenation of hydrocarbons.

Various modifications may obviously be made in the methods described above without departing from the scope of this invention, which is not to be limited by any examples or explanations presented herein, all of which are presented solely for purpose of illustration. This invention is to be limited only by the following claims, in which it is desired to claim all novelty insofar as the prior art permits.

I claim:

1. A process for preparing an improved catalyst suitable for hydrogen production by the reaction between a hydrocarbon and steam which comprises mixing a small amount of graphite with a powder comprising nickel and a substantial amount of a metal oxide not reducible with hydrogen under the conditions of the hydrocarbon-steam reaction, compressing the mixture into dense lumps of predetermined configuration, heating the lumps in an oxidizing atmosphere at a temperature above 1600° F. until the graphite is removed therefrom and heating the resulting lumps in a reducing atmosphere at a sufficiently high temperature to effect the conversion of nickel oxide to nickel.

2. A process for preparing an improved catalyst which comprises mixing, in powder form, nickel oxide, a greater amount of magnesia, about 2% of boric acid and between ½ and 2% of graphite, compressing the powder into tablets, heating the tablets in an oxidizing atmosphere at a temperature above about 1600° F. and then heating the tablets in a reducing atmosphere at a sufficiently high temperature to effect the conversion of nickel oxide to nickel.

3. A catalyst prepared according to the process defined in claim 1.

4. A catalyst prepared according to the process defined in claim 2.

5. A process for preparing an improved catalyst suitable for hydrogen production by the reaction between a hydrocarbon and steam, which comprises mixing a small amount of graphite with a powder comprising nickel, a substantial amount of a metal oxide not reducible with hydrogen under the conditions of the hydrocarbon-steam reaction, and a small amount of an inorganic compound reactive with said oxide at a temperature above 1600° F. to form a metal compound which has a fusion temperature above 2000° F., compressing the mixture into dense lumps of predetermined configuration, heating the lumps in an oxidizing atmosphere at a temperature above 1600° F., at which the inorganic compound is reactive and until the graphite is removed therefrom, and heating the resulting lumps in a reducing atmosphere at a sufficiently high temperature to effect the conversion of nickel oxide to nickel.

6. A process for preparing an improved catalyst suitable for hydrogen production by the reaction between a hydrocarbon and steam, which comprises mixing a small amount of graphite with a powder comprising nickel and a substantial amount of magnesia and a small amount of a weakly acidic inorganic compound reactive with magnesia at a temperature above 1600° F. to form a compound having a fusion temperature above 2000° F., compressing the mixture into dense lumps of predetermined configuration, heating the lumps in an oxidizing atmosphere at a temperature above 1600° F. at which the inorganic compound is reactive with magnesia and until the graphite is removed therefrom, and heating the resulting lumps in a reducing atmosphere at a sufficiently high temperature to effect the conversion of nickel oxide to nickel.

7. A process for preparing an improved catalyst suitable for high temperature catalytic reactions which comprises mixing a small amount of graphite with a catalyst powder comprising a metal oxide not readily reducible with hydrogen at temperatures of about 2000 to 3000° F. and which is solid at 2000° F., compressing the mixture into dense shaped forms and heating the shaped forms in an oxidizing atmosphere at a hardening temperature.

8. A process for preparing an improved catalyst suitable for high temperature catalytic reactions which comprises mixing a small amount of graphite with a solid catalyst powder capable of effecting said reactions, compressing the mixture into dense forms and thereafter heating the dense formations in an oxidizing atmosphere to burn the graphite contained therein.

9. A process for preparing a molded solid catalyst of improved mechanical strength capable of carrying out high temperature catalytic reactions which comprises admixing a small amount of graphite with said catalyst while in powdered form, thereafter molding said mixture, and heating the molded product in an oxidizing atmosphere at a temperature sufficient to burn said graphite.

ALEXIS VOORHIES, Jr.